United States Patent
Duppong et al.

(10) Patent No.: US 10,494,790 B2
(45) Date of Patent: Dec. 3, 2019

(54) RIDE CONTROL SYSTEM FOR POWER MACHINE

(71) Applicant: Clark Equipment Company, West Fargo, ND (US)

(72) Inventors: Gerald J. Duppong, Bismarck, ND (US); Trevor W. Krause, Bismarck, ND (US)

(73) Assignee: Clark Equipment Company, West Fargo, ND (US)

( * ) Notice: Subject to any disclaimer, the term of this patent is extended or adjusted under 35 U.S.C. 154(b) by 164 days.

(21) Appl. No.: 15/142,230

(22) Filed: Apr. 29, 2016

(65) Prior Publication Data

US 2016/0319516 A1 Nov. 3, 2016

Related U.S. Application Data

(60) Provisional application No. 62/154,598, filed on Apr. 29, 2015.

(51) Int. Cl.
*E02F 9/22* (2006.01)
*B60G 17/08* (2006.01)
(Continued)

(52) U.S. Cl.
CPC ............ *E02F 9/2257* (2013.01); *B60G 17/08* (2013.01); *E02F 9/2217* (2013.01);
(Continued)

(58) Field of Classification Search
CPC ......... E02F 9/2257; E02F 9/22; E02F 9/2217; F15B 21/14
See application file for complete search history.

(56) References Cited

U.S. PATENT DOCUMENTS

| | | | |
|---|---|---|---|
| 7,621,124 B2 * | 11/2009 | Mizoguchi | ............ E02F 9/2207 60/469 |
| 8,887,499 B2 * | 11/2014 | Edler | ............ F15B 11/055 60/431 |

(Continued)

FOREIGN PATENT DOCUMENTS

WO 2005035883 A1 4/2005

OTHER PUBLICATIONS

International Search Report and Written Opinion dated Jul. 18, 2016 for International Application No. PCT/US2016/030016 filed Apr. 29, 2016, 9 pages.

*Primary Examiner* — Karen Beck
(74) *Attorney, Agent, or Firm* — John D. Veldhuis-Kroeze; Westman, Champlin & Koehler, P.A.

(57) ABSTRACT

A ride control system for a power machine having a lift arm movably coupled to a frame. A hydraulic cylinder configured to selectively control movement of the lift arm relative to the frame. An accumulator is in selective communication with a first end of the hydraulic cylinder. A pressure sensor communicates a signal indicative of a hydraulic pressure at a first end of the hydraulic cylinder. A ride control circuit allows selective communication between the accumulator and the first end of the hydraulic cylinder. A controller receives the signal from the pressure sensor, and prevents communication between the accumulator and the first end of the hydraulic cylinder until the signal from the pressure sensor indicates a pressure below an initial pressure threshold value.

13 Claims, 4 Drawing Sheets

US 10,494,790 B2

Page 2

(51) Int. Cl.
*B60K 25/00* (2006.01)
*E02F 3/34* (2006.01)
(52) U.S. Cl.
CPC ...... *B60G 2300/09* (2013.01); *B60G 2500/10* (2013.01); *B60G 2800/162* (2013.01); *B60K 25/00* (2013.01); *E02F 3/3414* (2013.01)

(56) References Cited

U.S. PATENT DOCUMENTS

| | | | |
|---|---|---|---|
| 2007/0056277 A1* | 3/2007 | Mizoguchi | E02F 9/2207 60/413 |
| 2007/0056278 A1* | 3/2007 | Montineri | B66F 9/065 60/413 |
| 2009/0158726 A1* | 6/2009 | Hanks | E02F 9/2207 60/416 |
| 2009/0212473 A1* | 8/2009 | Matsuzaki | B60G 11/26 267/64.22 |
| 2013/0227937 A1* | 9/2013 | Dobchuk | E02F 9/2207 60/327 |
| 2014/0167971 A1* | 6/2014 | Stanley | E02F 9/264 340/666 |
| 2015/0081178 A1* | 3/2015 | Billaud | E02F 3/3414 701/50 |
| 2016/0319516 A1* | 11/2016 | Duppong | B60G 17/08 |
| 2017/0114525 A1* | 4/2017 | Rosa Neto | E02F 9/2253 |
| 2019/0270369 A1* | 9/2019 | Giorgio Bort | B62D 5/06 |

\* cited by examiner

RIDE CONTROL SYSTEM FOR POWER MACHINE

CROSS-REFERENCE TO RELATED APPLICATION

This application claims the benefit of U.S. Provisional Application No. 62/154,598, filed Apr. 29, 2015.

BACKGROUND

This disclosure relates to a ride control system for a power machine. Power machines, for the purposes of this disclosure, include any type of machine that generates power for the purpose of accomplishing a particular task or a variety of tasks. One type of power machine is a work vehicle. Work vehicles are generally self-propelled vehicles that have a work device, such as a lift arm (although some work vehicles can have other work devices) that can be manipulated to perform a work function. Some examples of work vehicle power machines include loaders, excavators, utility vehicles, tractors, and trenchers, to name a few.

Ride control, as that term is used herein, refers to allowing a work device (e.g., a lift arm) of a power machine to raise and lower to cancel vibrations and shock arising from bumps in the terrain as the power machine travels. Ride control can improve the comfort of an operator, especially in a power machine having fixed axles with no suspension. Typically, ride control is accomplished by exposing the base end of the lift cylinder or cylinders to an accumulator. Pressurized fluid moves between the base end of the cylinder and the accumulator and moves between a reservoir and the rod end to allow the lift arm assembly to oscillate up and down.

Power machines employing ride control typically include an on/off switch to manually place the base end into/out of communication with the accumulator. An operator is trained to flip the switch to the on position when traveling and to the off position when performing stationary work (e.g. a digging operation).

The discussion above is merely provided for general background information and is not intended to be used as an aid in determining the scope of the claimed subject matter.

SUMMARY

In one embodiment, a ride control system for a power machine having a frame, a lift arm movably coupled to the frame, a hydraulic power source is disclosed. The ride control system includes a hydraulic cylinder having a first end and a second end, the hydraulic cylinder configured to selectively control movement of the lift arm relative to the frame, an accumulator in selective communication with the first end of the hydraulic cylinder, a pressure sensor capable of communicating a signal indicative of a hydraulic pressure at the first end of the hydraulic cylinder and a ride control circuit configured to allow selective communication between the accumulator and the first end of the hydraulic cylinder. In addition, a controller is configured to receive the signal from the pressure sensor. The controller is configured to prevent communication between the accumulator and the first end of the hydraulic cylinder until the signal from the pressure sensor indicates a pressure below an initial pressure threshold value.

In another embodiment, a power machine is disclosed. The power machine has a frame, a lift arm operably coupled to the frame and capable of moving relative to the frame, a hydraulic actuator coupled between the frame and the lift arm such that movement of the hydraulic actuator causes the lift arm to move relative to the frame, and a power source capable of selectively providing pressurized fluid to control movement of the hydraulic actuator. In addition, the power machine has a ride control system for dampening loads introduced into the power machine when traveling over a support surface. The ride control system has a storage device capable of storing pressurized fluid, a switching circuit for selectively allowing communication between the storage device and a first side of the hydraulic actuator such that when communication is allowed between the storage device and the first side of the hydraulic actuator, the lift arm is capable of moving relative to the frame, and a pressure sensor capable of providing a signal indicative of a pressure at the first side of the hydraulic actuator. A controller is in communication with the pressure sensor and the switching circuit. The controller is configured to control the switching circuit to allow communication between the storage device and the first end of the hydraulic cylinder when the signal from the pressure sensor indicates a pressure above an operational minimum pressure threshold.

In another embodiment, a method of providing a ride control feature to dampen loads introduced into a power machine when traveling over a support surface is disclosed. The ride control feature selectively provides pressurized hydraulic fluid from a storage device to a first side of a hydraulic actuator coupled between a lift arm and a frame of the power machine to allow the lift arm to move relative to the frame. The method includes sensing pressure at the first side of the hydraulic actuator and blocking flow between the storage device and the first side of the actuator until the sensed pressure is below an initial threshold value. After sensing pressure below the initial threshold, the method allows flow between the storage device and the first side of the actuator when the sensed pressure is between a minimum pressure threshold and a high pressure threshold.

In another embodiment, a method of providing a ride control feature to dampen loads introduced into a power machine when traveling over a support surface is disclosed. The method selectively provides pressurized hydraulic fluid from a storage device to a first side of a hydraulic actuator coupled between a lift arm and a frame of the power machine to allow the lift arm to move relative to the frame. The method senses pressure at the first side of the hydraulic actuator and allows flow between the storage device and the first side of the actuator when the sensed pressure is between a minimum pressure threshold and a high pressure threshold.

This Summary and the Abstract are provided to introduce a selection of concepts in a simplified form that are further described below in the Detailed Description. The Summary and the Abstract are not intended to identify key features or essential features of the claimed subject matter, nor are they intended to be used as an aid in determining the scope of the claimed subject matter.

DETAILED DESCRIPTION

The concepts disclosed herein are not limited in their application to the details of construction and the arrangement of components set forth in the following description or illustrated in the following drawings. That is, the embodiments disclosed herein are illustrative in nature. The concepts illustrated in these embodiments are capable of being practiced or being carried out in various ways. The terminology used herein is for the purpose of description and should not be regarded as limiting. Words such as "including," "comprising," and "having" and variations thereof as used herein are meant to encompass the items listed thereafter, equivalents thereof, as well as additional items.

Figure 1:
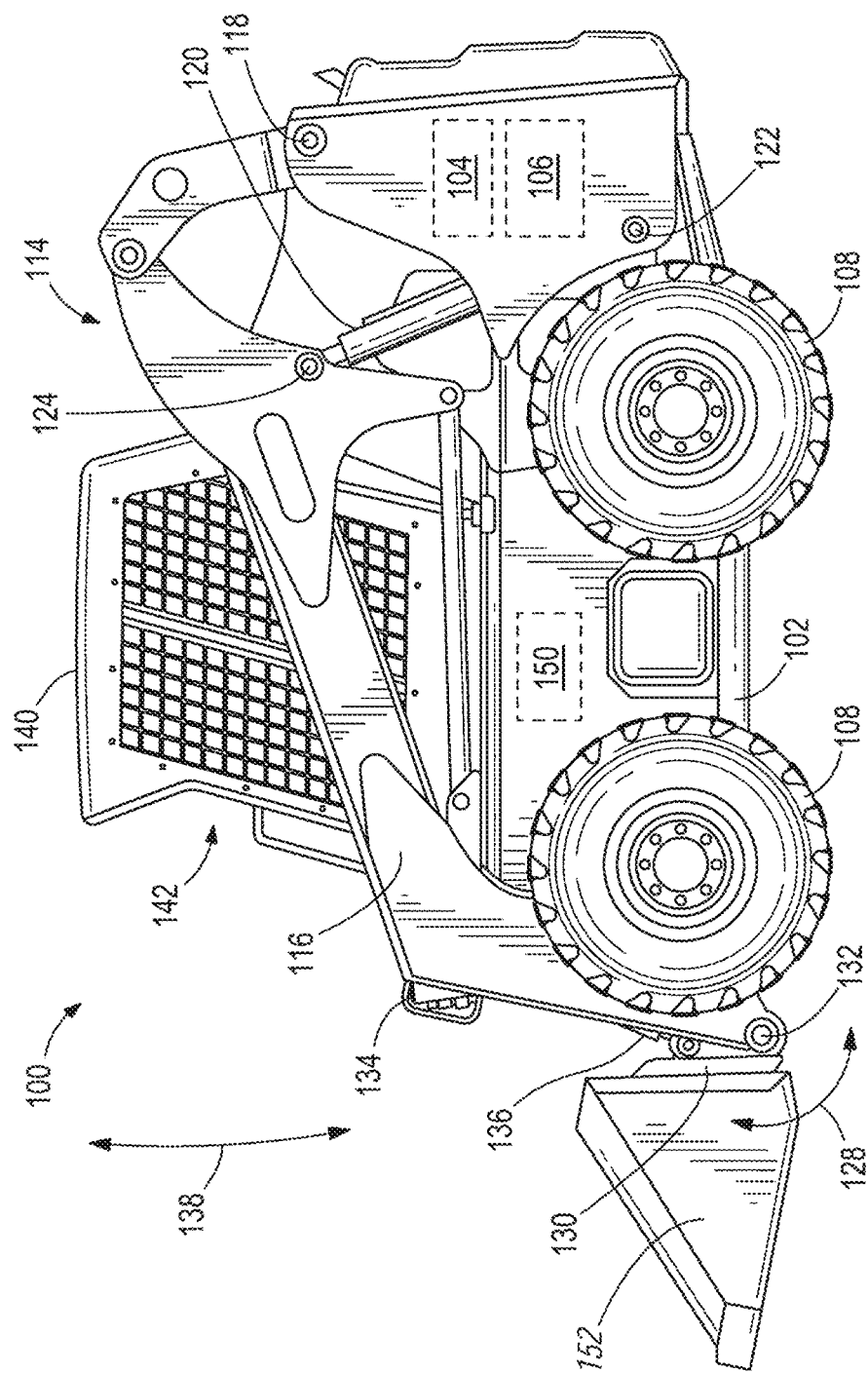
FIG. 1 is a side elevation view of a representative power machine of the type that can employ a ride control system according to one illustrative embodiment.

FIG. 1 is a side elevation view of a representative power machine 100 upon which the disclosed embodiments can be employed. The power machine 100 illustrated in FIG. 1 is a work vehicle in the form of a skid-steer loader, but other types of work vehicles such as tracked loaders, steerable wheeled loaders, including all-wheel steer loaders, excavators, telehandlers, walk behind loaders, trenchers, and utility vehicles, as well as other power machines, may employ the disclosed embodiments. The power machine 100 includes a supporting frame or main frame 102, which supports a power source 104, which in some embodiments is an internal combustion engine. A power conversion system 106 is operably coupled to the power source 104. Power conversion system 106 illustratively receives power from the power source 104 and operator inputs to convert the received power into power signals in a form that is provided to and utilized by functional components of the power machine. In some embodiments, such as with the power machine 100 in FIG. 1, the power conversion system 106 includes hydraulic components such as one or more hydraulic pumps and various actuators and valve components that are illustratively employed to receive and selectively provide power signals in the form of pressurized hydraulic fluid to some or all of the actuators used to control functional components of the power machine 100. Alternatively, the power conversion system 106 can include electric generators or the like to generate electrical control signals to power electric actuators. For the sake of simplicity, the actuators discussed in the disclosed embodiments herein are referred to as hydraulic or electrohydraulic actuators primarily in the form of motors and cylinders, but other types of actuators can be employed in some embodiments.

Among the functional components that are capable of receiving power signals from the power conversion system 106 are tractive elements 108, illustratively shown as wheels, which are configured to rotatably engage a support surface to cause the power machine to travel. Other examples of power machines can have tracks or other tractive elements instead of wheels. In an example embodiment, a pair of hydraulic motors (not shown in FIG. 1), are provided to convert a hydraulic power signal into a rotational output. In power machines such as skid-steer loaders, a single hydraulic motor can be operatively coupled to both of the wheels on one side of the power machine. Alternatively, a hydraulic motor can be provided for each tractive element to allow for independent drive control for each tractive element on a machine. Steering a skid-steer loader is accomplished by providing unequal rotational outputs to the tractive element or elements on one side of the machine as opposed to the other side. In some power machines, steering is accomplished through other means, such as, for example, steerable axles or articulating frames.

The power machine 100 also includes a lift arm structure 114 that is capable of being raised and lowered with respect to the frame 102. The lift arm structure 114 illustratively includes a lift arm 116 that is pivotally mounted to the frame 102 at joint 118. An actuator 120, which in some embodiments is a hydraulic cylinder configured to receive pressurized fluid from power conversion system 106, is pivotally coupled to both the frame 102 and the lift arm 116 at joints 122 and 124, respectively. Actuator 120 is sometimes referred to as a lift cylinder, and is a representative example of one type of actuator that may be used in a power machine 100. Extension and retraction of the actuator 120 causes the lift arm 116 to pivot about joint 118 such that an end of the lift arm 116 represented generally by a joint 132 (discussed in more detail below) is raised and lowered along a generally vertical path indicated approximately by arrow 138. The lift arm 116 is representative of one type of lift arm that may be attached to the power machine 100. The lift arm structure 114 shown in FIG. 1 includes a second lift arm and actuator disposed on an opposite side of the of the power machine 100, although neither is shown in FIG. 1. Other lift arm structures, with different geometries, components, and arrangements can be coupled to the power machine 100 or other power machines upon which the embodiments discussed herein can be practiced without departing from the scope of the present discussion. For example, power machines can have a lift arm such that joint 132 is raised in a generally radial path. Other power machines such as excavators and telehandlers have substantially different lift arm geometries as well as joints from those on the power machine 100 illustrated in FIG. 1.

An implement carrier 130 is pivotally mounted to the lift arm 116 at joint 132. One or more actuators such as hydraulic cylinder 136 are pivotally coupled to the implement carrier 130 and the lift arm structure 114 to cause the implement carrier to rotate under power about an axis that extends through the joint 132 in an arc approximated by arrow 128 in response to operator input. In some embodiments, the one or more actuators pivotally coupled to the implement carrier 130 and the lift arm assembly 114 is a hydraulic cylinder capable of receiving pressurized hydraulic fluid from the power conversion system 106. In these embodiments, the one or more hydraulic cylinders 136, which are sometimes referred to as tilt cylinders, are further representative examples of actuators that may be used in a power machine 100. An implement in the form of a bucket 152 is shown as being secured to the implement carrier 130 in FIG. 1. However, the implement carrier 130 is configured to accept and secure any one of a number of different implements to the power machine 100 as may be desired to accomplish a particular work task. Other power machines can have different types of implement carriers than the one shown in FIG. 1. Still other power machines do not have implement carriers and instead allow for implements that are directly attached to a lift arm.

Implements other than the illustrated bucket 152 that include various actuators such as cylinders and motors, to name two examples, can also be secured to the implement carrier 130 to accomplish a variety of tasks. A partial list of the types of implements that can be secured to the implement carrier 130 includes augers, planers, graders, combination buckets, wheel saws, and the like. The power machine 100 provides a source, accessible at port 134, of power and control signals that can be coupled to an implement to control various functions on such an implement, in response to operator inputs. In one embodiment, port 134 includes hydraulic couplers that are connectable to an implement for providing power signals in the form of pressurized fluid provided by the power conversion system 106 for use by an implement that is operably coupled to the power machine 100. Alternatively or in addition, port 134 includes electrical connectors that can provide power signals and control signals to an implement to control and enable actuators of the type described above to control operation of functional components on an implement.

Power machine 100 also illustratively includes a cab 140 that is supported by the frame 102 and defines, at least in part, an operator compartment 142. Operator compartment 142 typically includes an operator seat, operator input devices, and display devices that are accessible and viewable from a sitting position in the seat (none of which are shown in FIG. 1). When an operator is seated properly within the operator compartment 142, the operator can manipulate operator input devices to control such functions as driving the power machine 100, raising and lowering the lift arm structure 114, rotating the implement carrier 130 about the lift arm structure 114 and make power and control signals available to an implement via the sources available at port 134.

Power machine 100 also includes an electronic controller 150 that is configured to receive input signals from at least some of the operator input devices and provide control signals to the power conversion system 106 and to implements via port 134. It should be appreciated that electronic controller 150 can be a single electronic control device with instructions stored in a memory device and a processor that reads and executes the instructions to receive input signals and provide output signals all contained within a single enclosure. Alternatively, the electronic controller 150 can be implemented as a plurality of electronic devices coupled on a network. The disclosed embodiments are not limited to any single implementation of an electronic control device or devices. The electronic device or devices such as electronic controller 150 are programmed and configured by the stored instructions to function and operate as described.

Many power machines such as power machine 100 include a power conversion system that provides pressurized hydraulic fluid as an output to various actuators to perform various work tasks. One example of such an actuator is a motor and a more particular example is a drive motor. Drive motors receive pressurized hydraulic fluid and drive tractive elements such as tractive elements 108.

Figure 2:
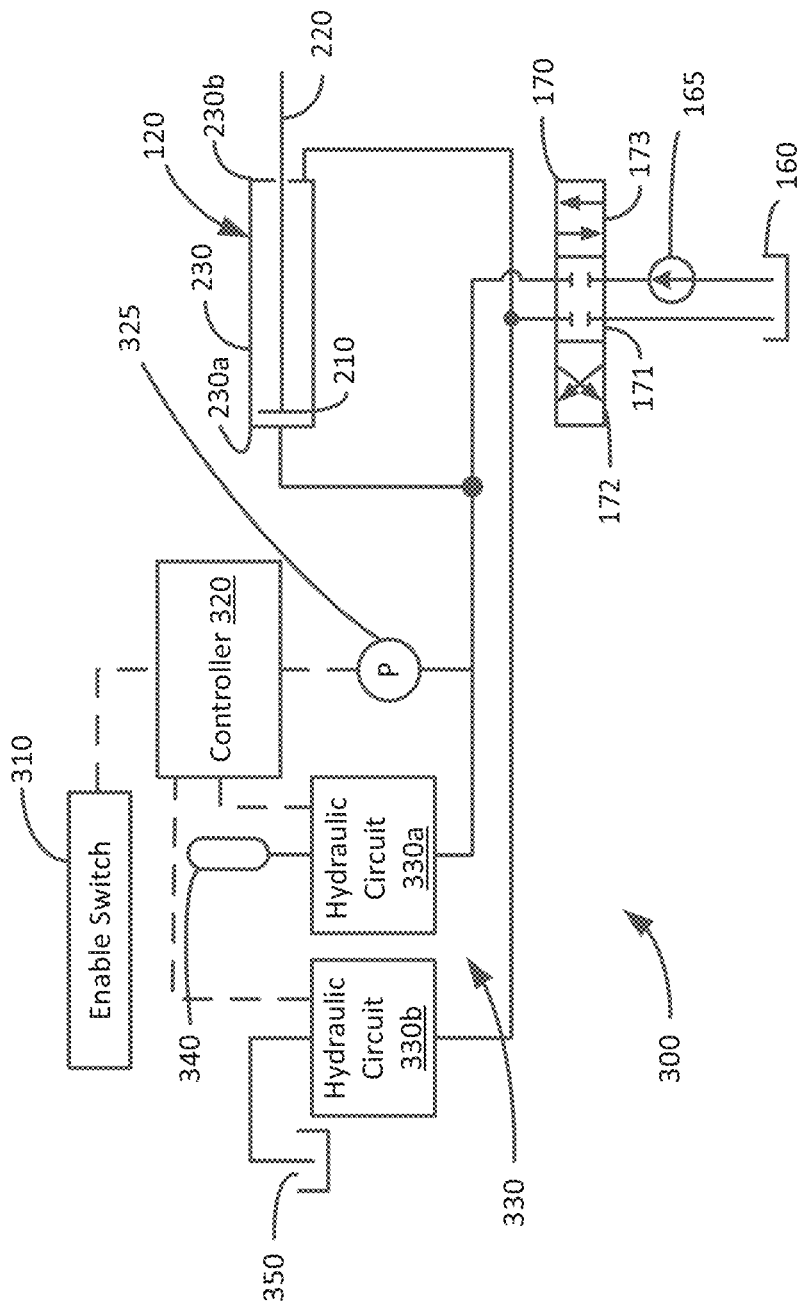
FIG. 2 is a block diagram illustrating one configuration of a ride control system according to one illustrative embodiment.

FIG. 2 illustrates a lift arm control system 300, which includes the actuator 120, a reservoir 160, a pump 165, and a lift control valve 170 according to one illustrative embodiment. The embodiments discussed herein are directed toward power machines with a lift arm actuator that extends to raise a lift arm and retract to lower a lift arm. In other embodiments, the geometry of the lift arm is such that extension of the lift actuator results in the lowering of the lift arm. The actuator 120 is a hydraulic cylinder that includes a cylinder body 230 having a base end 230a and a rod end 230b. The cylinder body 230 houses a piston 210 that is moveable with the cylinder body. A rod 220 is attached to the piston 210 and extends from the rod end 230b of the cylinder body 230. The piston 210 moves within the cylinder body 230 to linearly move the rod 220 along its axis so that it can extend from and retract into the cylinder body.

The reservoir 160, pump 165, and lift control valve 170 shown in FIG. 2 may be part of the power conversion system 106 discussed above. The reservoir 160 contains hydraulic fluid that is used to actuate the actuator 120. The pump 165 draws hydraulic fluid out of the reservoir 160 and pressurizes the hydraulic fluid to provide the fluid to the lift control valve 170, which in turn selectively provides pressurized hydraulic fluid to the actuator 120. The pump 165 may be, for example, the hydraulic pump providing hydraulic fluid to the implement of the power machine 100 discussed above.

Figure 3:
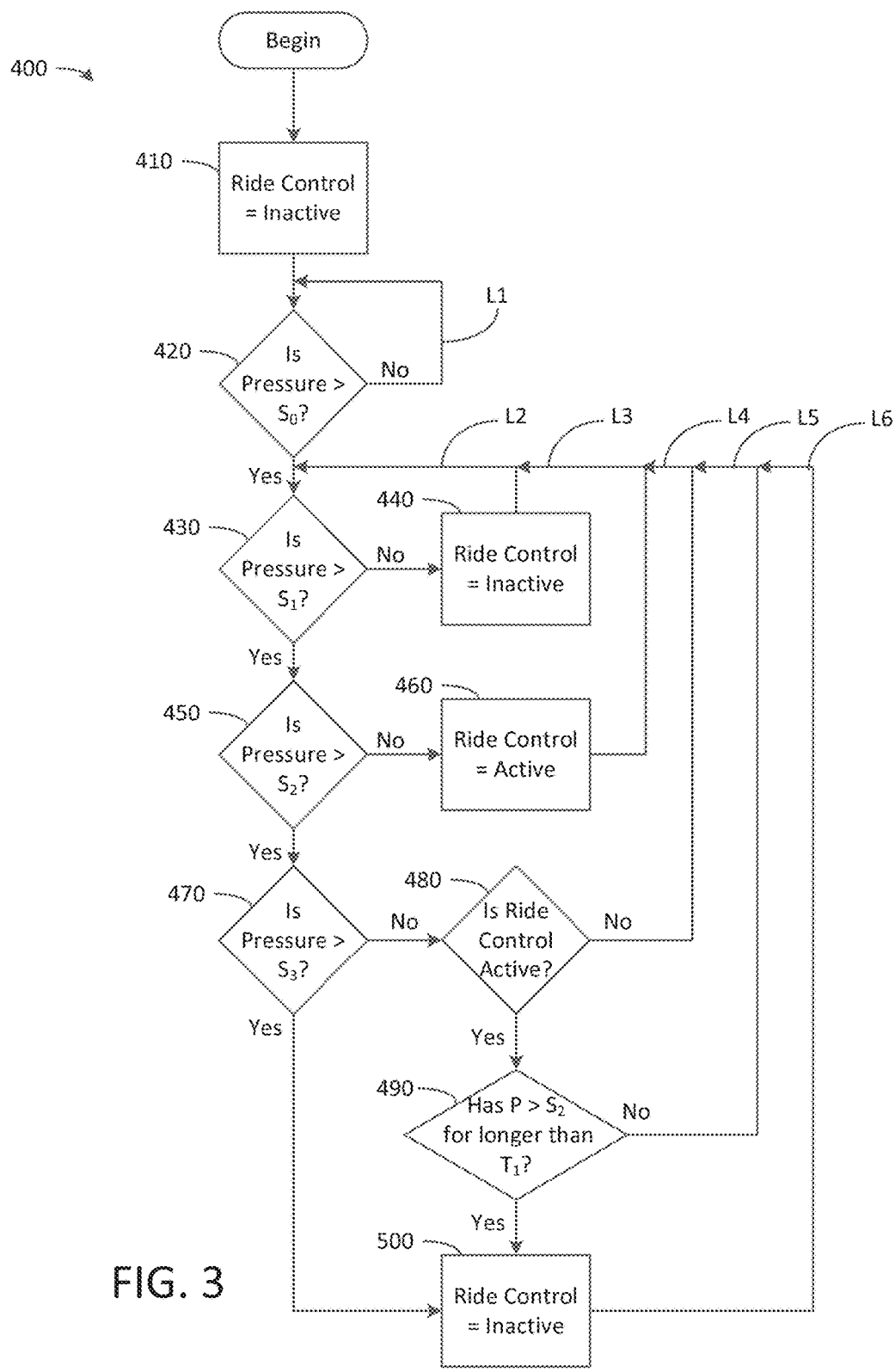
FIG. 3 is a flowchart describing the control logic of the ride control system according to one illustrative embodiment.

The lift control valve 170 shown in FIG. 2 is a simplification of a control valve shown to illustrate how hydraulic fluid is permitted to flow between the pump 165 and the actuator 120, and whether pressurized fluid flows to the base end 230a or to the rod end 230b, with fluid from the opposing side being returned to the tank. The lift control valve 170 can be implemented in various ways, including as part of a multi-spool, open center series valve. For the purposes of this discussion, lift control valve 170 has a center position 171, a left position 172, and a right position 173. When the lift control valve 170 is in the center position 171 (as shown in FIG. 3), the lift control valve 170 blocks the flow of hydraulic fluid from through the lift control valve. In this position, the actuator 120 is normally unable to move (normally meaning when the ride control system as described below does not allow for movement of the actuator 120) because hydraulic fluid cannot flow out of either end 230a, 230b of the cylinder body 230. When shifted to the right position 173, the lift control valve 170 directs hydraulic fluid from the pump 165 to the base end 230a of the actuator 230, and provides a path to allow hydraulic fluid to flow from the rod end 230b back to the reservoir 160. For the purposes of this disclosure, moving the lift control valve 170 to the right position 171 will "power up" the lift arm. In the right position 173, the actuator 120 extends the rod 220 and lifts the lift arm 116. When shifted to the left position 172, the lift control valve 170 directs hydraulic fluid from the pump 165 to the rod end 230b and returns hydraulic fluid from the base end 230a to the reservoir 160, so that the rod 220 retracts into the cylinder body 230. For the purposes of this disclosure, moving the lift control valve 170 to the left position 172 will "power down" the lift arm the lift arm 116 is lowered.

FIG. 2 also illustrates one implementation or configuration of a ride control system 300 for use with the actuator 120. As the power machine 100 travels over terrain under the influence of the tractive elements 108, bumps in the terrain give rise to vibrations and shock (collectively, "impact loads") to the frame 102. Other impact loads can be imparted to the frame 102 via movement of attached work implements or the lift arms themselves even when the machine is stationary (i.e. not traveling). The impact loads can propagate throughout the power machine 100 and into the operator compartment 142, causing discomfort to the operator in the operator compartment 142. The ride control system 300 permits the piston 210 and rod 220 to move within the cylinder body 230 so that the lift arm 116 can move up and down in reaction to the impact loads. The lift arm movement gives rise to reactive loads that oppose the impact loads to cancel or damp the impact loads and improve operator comfort.

The ride control system 300 includes an enable switch 310, a controller 320, a pressure sensor 325, a ride control hydraulic circuit 330, an accumulator 340 or other suitable storage device capable of storing pressurized hydraulic fluid, and a reservoir 350. The enable switch 310 is a manual operator switch preferably located in the operator compartment 142. When the operator wishes to turn ride control functionality on or off, the operator manually adjusts the enable switch 310 to "enable" and "disable" positions, respectively. The controller 320 may be a dedicated controller for the ride control system 300 or may be part of the overall electronic controller 150 of the power machine 100 described above. The pressure sensor 325 senses the pressure of hydraulic fluid communicating with the one end, in this embodiment where extension of the actuator causes the lift arm to be raised, the base end 230a of the cylinder body 230.

The controller 320 takes as inputs the "enable" or "disable" signal from the enable switch 310 and a pressure signal from the pressure sensor 325. The input signals may be electronic signals or signals of another kind (e.g., pressure signals or mechanical signals) suitable for a particular application. An enable signal from the enable switch turns on the ride control system 300. When the ride control system 300 is turned on, signals from the controller 320 selectively actuate the ride control feature by activating and de-activating the ride control hydraulic circuit 330. When the ride control hydraulic circuit 330 is activated, the actuator 120 is placed in communication with the accumulator 340 and reservoir 350. When the ride control hydraulic circuit 330 is de-activated, the actuator 120 is not in communication with the accumulator 340 and reservoir 350. Thus, having the ride control system 300 on does not necessarily mean that the actuator 120 is in communication with the accumulator 340 and the reservoir 350. Rather, when the ride control system is on, the controller 320 will selectively activate the ride control feature, based on sensed conditions on the power machine, which will be discussed in more detail below. Conversely, when the controller 320 receives the "disable" signal from the enable switch 310, the ride control system 300 is turned off and the accumulator 340 and the reservoir 350 are not placed in communication with the actuator 120.

The ride control hydraulic circuit 330 as shown in FIG. 2 includes a first hydraulic circuit 330a, which acts like a switch between the accumulator 340 and the actuator 120 and a second hydraulic circuit 330b, which acts like a switch between the reservoir 350 and the actuator 120. The hydraulic circuits 330a, 330b can be any configuration that selectively allows flow therethrough, including a two-position, two-way valve which allows flow in one position and blocks flow in the other position. Any number of different hydraulic circuits can be employed. The base-side hydraulic circuit 330a opens and closes communication between the base end 230a of the cylinder 230 and the accumulator 340, and the rod-side hydraulic circuit 330b opens and closes communication between the rod end 230b and the reservoir 350. For ride control to be on, both the first hydraulic circuit 330a and the second hydraulic circuit 330b must be activated. Consequently, the ride control hydraulic circuit 330 can take a single input from the controller 320 to simultaneously activate circuits 330a, 330b. The reservoir 350 can be a dedicated tank or can communicate with or be part of the reservoir 160.

When the ride control feature is active, impact loads that are introduced to the power machine 100 will cause the lift arm 116 to move up and down. When the ride control feature is active, hydraulic fluid is displaced between the base end 230a and the accumulator 340 through the base-side hydraulic circuit 330a. Simultaneously, hydraulic fluid is displaced between the reservoir 350 and the rod side 230b through the rod-side hydraulic circuit 330b. When hydraulic fluid is forced into the accumulator 340 as the rod 220 retracts into the cylinder body 230, pressure increases in the accumulator 340. As forces on the rod 220 and pressure in the accumulator 340 change, the accumulator 340 is able to force hydraulic fluid back into the base end 230a.

The pressure sensor 325 measures the pressure at the base end 230a of the cylinder body 230. The pressure reading is an indication of the load on the lift arm 116, which may indicate whether the lift arm 116 is raised above a lowest position (i.e. off of mechanical stops), or whether the lift arm 116 has been lowered. It may also indicate whether a large load is being carried by an implement (e.g., the bucket 152). The controller 320 is programmed with logic to activate and de-activate the ride control feature when the ride control system is on and certain conditions are met as indicated by the signals the controller 320 receives from the pressure sensor 325.

FIG. 3 is a logic flow chart of a method 400 in which the controller 320 can implement the ride control system according to one illustrative embodiment. The method 400 assumes that an enable signal has been provided to the controller 320 from the enable switch 310, as the ride control features cannot otherwise be activated. The flow chart of FIG. 3 illustrates several pressure set points programmed into the controller's memory: $S_0$ (initial pressure threshold), $S_1$ (minimum pressure threshold), $S_2$ (high pressure threshold), and $S_3$ (extremely high pressure threshold). Controller 320 monitors the pressure at the pressure sensor 325 and controls the hydraulic circuit 330 in response to the measured pressure at pressure sensor 325. In one exemplary setup, $S_0$ may be 700 psi, $S_1$ may be 500 psi, $S_2$ may be 2400 psi, and $S_3$ may be 2800 psi. These values are provided for example only and may vary widely depending on the hydraulic system of a particular power machine. While in the embodiment shown in FIG. 3 illustrates four distinct pressure set points and example pressures of four different levels are illustrated, in some embodiments, there may be a different number of pressure set points or one or more pressure set points may have the same value. For example, $S_0$ and $S_1$ may have the same value.

The controller 320 turns ride control on and off based on how the pressure measured at the pressure sensor 325 compares to these set points and other conditions. The term "pressure" hereafter will refer to pressure at the pressure sensor 325 (i.e., at the base end 230a of the lift actuator 120) unless otherwise specified.

The method 400 begins at block 410 with the ride control feature de-activated and the routine for controlling the ride control feature newly initialized. The method begins with an initial pressure check, shown at decision point 420. At block 420, the controller 320 compares the pressure to $S_0$. The controller 320 will not enter the main part of the logic flow chart until the pressure is less than $S_0$. The logic continues to loop and query the pressure until it is below $S_0$; this initial pressure check loop is identified in FIG. 3 as L1.

The purpose of logic loop L1 is to achieve the same or nearly the same pressure in the base end 230a as in the accumulator 340. $S_0$ should therefore be set to a pressure at or near a level that the accumulator 340 is expected to be charged. When the controller 320 activates the ride control feature, the accumulator 340 and the base end 230a are placed into communication with each other via hydraulic circuit 330. If there is a sufficiently large difference between the pressure in the accumulator 340 and the pressure at the base end 230a, there may be a brief, inadvertent movement of the lift arm 116 when on the accumulator 340 and base end 230a are placed into communication with each other.

The pressure falling below $S_0$ indicates that the lift arm 116 is being powered down or that there is a minimal load on the lift arms 116. Such periods of relatively low pressure are a desirable time to activate the ride control feature for the first time after the ride control system has been initialized in block 410 of the method 400. Effectively, $S_0$ requires the operator to either power down the lift arms 116 or have a minimal load thereon before the ride control feature can be activated. This can happen when no implement is attached to lift arm 116, when a relatively light weight implement is attached to the lift arm (e.g. a bucket with no material in it), or the lift arm is fully lowered onto mechanical stops. If the lift arm 116 is being lowered, the pressure can be equalized (between the accumulator 340 and the base end 230a) during an intended powering down of the lift arm 116.

Once the controller 320 has sensed that the initial pressure condition at block 420 has been satisfied, the controller 320 then compares the pressure to set point $S_1$, which is the minimum pressure at which the ride control feature can be activated. This is illustrated at block 430. Pressure not greater than $S_1$ may indicate that the lift arm 116 is fully lowered or nearly fully lowered as there may be a reduction of the load at some point just above the fully lowered position. For example, when the lift arm 116 is nearly fully lowered, applications such as back dragging (i.e. using the edge of a bucket to drag material while driving the power machine backwards) may apply a tension load to the lift arm that reduces the pressure at the cylinder base. In such a situation, it is advantageous to temporarily de-activate the ride control feature. When this occurs, the ride control feature is de-activated as shown at block 440 until the pressure rises above $S_1$. The loop in which the controller 320 turns ride control off and waits for pressure to rise above $S_1$ is referred to as loop L2. The method 400 as described herein is advantageous because the ride control system is automatically turned on and off when the logic determines that different operations are being performed (i.e. when the logic reacts to the pressure falling below $S_1$); the operator is not required to manually deactivate the ride control feature during different operations, as long as the ride control system 300 is on.

If the controller 320 determines that the pressure is greater than $S_1$, the controller 320 next compares the pressure to the $S_2$ set point at block 450. If the pressure is not greater than $S_2$, the controller 320 activates the ride control feature as shown at block 460 and loops back to check the pressure against set points $S_1$ and $S_2$. As long as the pressure is greater than $S_1$ and not greater than $S_2$, ride control feature remains activated. It should be noted that when the ride control feature is activated, it remains activated regardless of the position of the lift control valve 170. In other words, the ride control feature can be active when the lift arm cylinder 120 is being powered up or down by pressurized fluid from pump 160. This loop is labeled in FIG. 3 as L3 and is the loop in which ride control functions during typical power machine operation.

If, while the method 400 is in loop L3, pressure falls below $S_1$, the method drops back into loop L2. In loop L2, ride control feature is de-activated as noted above and the controller 320 continues to monitor pressure until it again exceeds $S_1$. If, while in loop L3, pressure rises above $S_2$, the controller 320 starts a timer and the method 400 moves to block 470. The timer continues to run until pressure falls below $S_2$.

At block 470, the controller 320 compares the pressure to $S_3$. If pressure does not exceed $S_3$, the controller 320 queries at block 480 whether on the ride control feature is currently activated. If the ride control feature is de-activated, the method 400 enters loop L4. The method 400 will remain in loop L4 while pressure is greater than $S_1$ (at 430), greater than $S_2$ (at 450), but not greater than $S_3$ (at 470) with ride control off (at 480).

If, at block 480, the ride control feature is activated, the controller 320 will query the timer that was started when pressure first exceeded $S_2$. If pressure has not exceeded $S_2$ for longer than a period $T_1$, the method 400 enters loop L5. While pressure is greater than $S_2$ but not greater than $S_3$, the method 400 will remain in loop L5 with the controller 320 watching the timer.

If the method 400 remains in loop L5 for more than period $T_1$, the controller 320 will deactivate the ride control feature at box 500 and enter loop L6. If at block 470 the pressure exceeds $S_3$, the method 400 will turn off ride control at box 500 and enter or remain within loop L6 without checking the timer. The method 400 will remain in loop L6 until pressure is no longer greater than $S_2$ (at which time it falls into loop L3 with ride control turned on at 460). If pressure drops further to the point that it is not greater than $S_1$, the method turns ride control off and drops into loop L2.

In summary, the method 400 illustrated in FIG. 3 and detailed above for the ride control system 300 will not start unless the enable switch is set to "enable" and the pressure passes the initial pressure check (i.e., the pressure is measured at a level less than $S_0$) so that the accumulator 340 and base end 230a are at approximately the same pressure. Once the initial pressure check is passed, the controller 320 will determine whether to activate or de-activate the ride control feature based on inputs from the pressure sensor 325, which measures pressure on the base side 230a of the lift actuator 120. After the initial pressure check, the ride control feature will be activated while pressure is greater than minimum pressure ($S_1$) and not greater than high pressure ($S_2$). The method 400 will maintain ride control on (loop L3) until certain conditions are met. If pressure drops below minimum pressure ($S_1$), ride control is turned off. If pressure exceeds high pressure ($S_2$) for more than a preset period ($T_1$) or if pressure exceeds extremely high pressure ($S_3$) then ride control is turned off.

The values $S_0$, $S_1$, $S_2$, $S_3$ and $T_1$ can be preprogrammed into the controller's memory or alternatively calculated by the controller or programmed manually by the power machine operator. The values can be different for different sizes and types of power machines, applications, or operator preferences. For example, when using a particular implement, it may advantageous to have at least one of the values altered to accommodate the implement and its weight.

Figure 4:
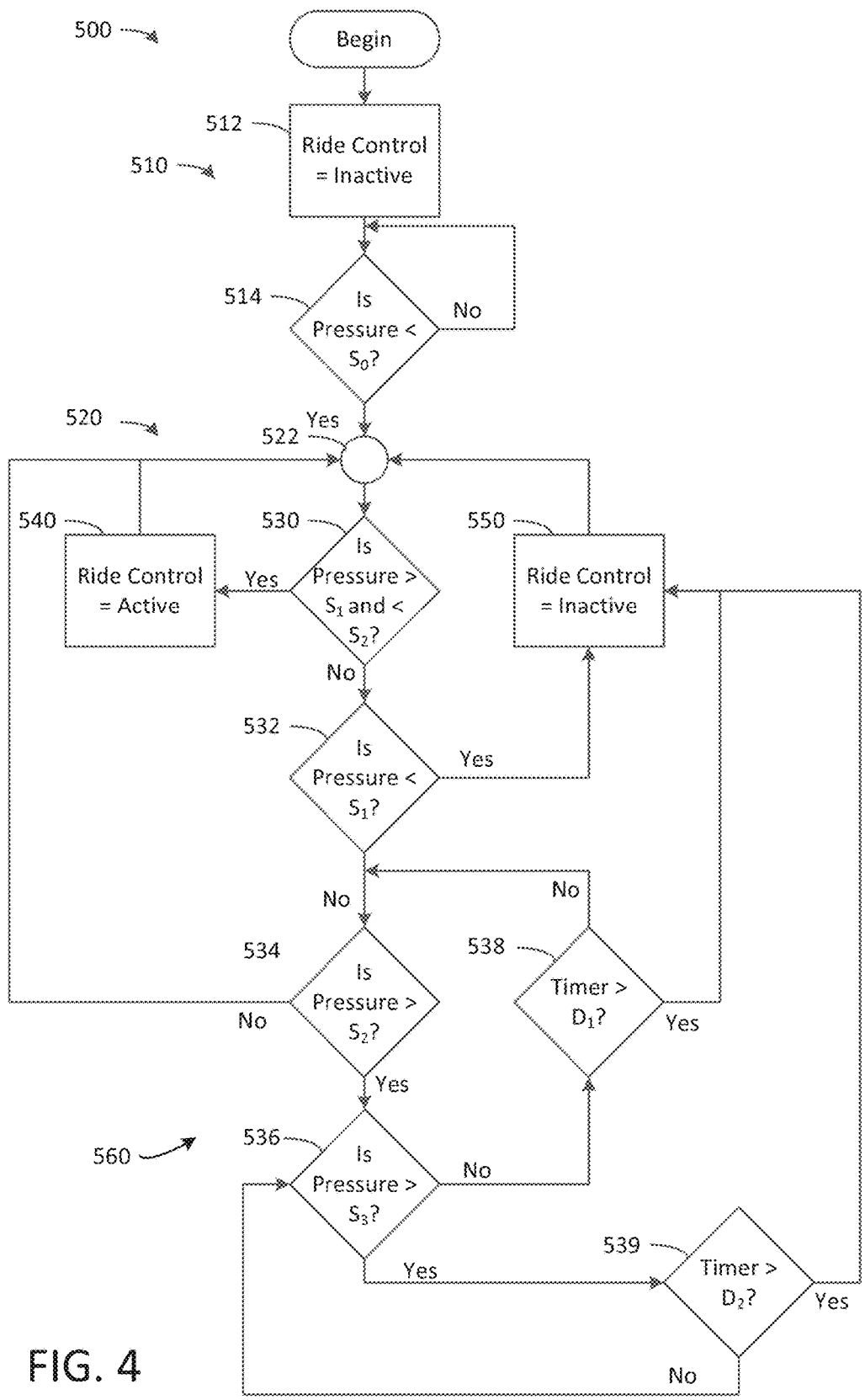
FIG. 4 is a flowchart describing the control logic of the ride control system according to another illustrative embodiment.

FIG. 4 is a logic flow chart of a method 500 in which the controller 320 can implement the ride control system according to another illustrative embodiment. The method 500 assumes that an enable signal has been provided to the controller 320 from the enable switch 310, as the ride control features cannot otherwise be activated. The flow chart of FIG. 4 illustrates several pressure set points programmed into the controller's memory: $S_0$ (initial pressure check), $S_1$ (minimum pressure), $S_2$ (high pressure), and $S_3$ (extremely high pressure). Controller 320 monitors the pressure at the pressure sensor 325 and controls the hydraulic circuit 330 responsive to the measured pressure at pressure sensor 325. In one exemplary setup, $S_0$ may be 700 psi, $S_1$ may be 400 psi, $S_2$ may be 3600 psi, and $S_3$ may be 4300 psi. These values are provided for example only and may vary widely depending on the hydraulic system and hydraulic components of a particular power machine. While in the embodiment shown in FIG. 4 illustrates four distinct pressure set points and example pressures of four different levels are illustrated, in some embodiments, there may be a different number of pressure set points or one or more pressure set points may have the same value.

The method 500 includes an initialization portion 510 and an operation portion 520. In the initialization portion of the method, the ride control feature has moved from a de-activated condition to an activated condition in response, for example, to an operator input indicating a desire to activate the ride control feature by activating enable switch 310. In some embodiments, a machine may be started with the enable switch activated 310 and as such; the initialization portion 510 of the method is begun at startup of the machine. The initialization portion 510 begins at block 512 with the ride control feature de-activated and the routine for controlling the ride control feature newly initialized. The method begins with an initial pressure check, shown at decision point 514. At block 514, the controller 320 compares the pressure to $S_0$. The controller 320 will not enter the operating portion 520 of the method 500 until the pressure is less than $S_0$.

The purpose of initialization portion 510 of the method 500 is to achieve the same or nearly the same pressure in the base end 230a as in the accumulator 340. $S_0$ should therefore be set to a pressure at or near a level that the accumulator 340 is expected to be charged. When the controller 320 activates the ride control feature, the accumulator 340 and the base end 230a are placed into communication with each other via hydraulic circuit 330. If there is a sufficiently large difference between the pressure in the accumulator 340 and the pressure at the base end 230a, there may be a brief, inadvertent movement of the lift arm 116 when on the accumulator 340 and base end 230a are placed into communication with each other.

The pressure falling below $S_0$ indicates that the lift arm 116 is being powered down or that there is a minimal load on the lift arms 116. Such periods of relatively low pressure are a desirable time to activate the ride control feature for the first time after the ride control system has been initialized in block 410 of the method 400. Effectively, $S_0$ requires the operator to either power down the lift arms 116 or have a minimal load thereon before the ride control feature can be activated. This can happen when no implement is attached to lift arm 116, when a relatively light weight implement is attached to the lift arm (e.g. a bucket with no material in it), or the lift arm is fully lowered onto mechanical stops. If the lift arm 116 is being lowered, the pressure can be equalized (between the accumulator 340 and the base end 230a) during an intended powering down of the lift arm 116.

Once the controller 320 has sensed that the initial pressure condition at block 514 has been satisfied, the method moves to the beginning of the operational portion 520 of the method, represented by node 522. From node 522, the method moves to block 530, where the control loop controller 320 then compares the pressure to set point $S_1$, which is the minimum pressure threshold at which the ride control feature can be activated and set point $S_2$, which is the high pressure threshold. If the pressure is between set points $S_1$ and $S_2$, the method moves to block 540, where the ride control feature is activated, and the method returns to node 522, for another run through the operational portion 520 of the method.

It is not advantageous to operate the ride control feature below set point 51, because at such a low pressure, the lift arm 116 may fully lowered or nearly fully lowered as there may be a reduction of the load at some point just above the fully lowered position. For example, when the lift arm 116 is nearly fully lowered, applications such as back dragging (i.e. using the edge of a bucket to drag material while driving the power machine backwards) may apply a tension load to the lift arm that reduces the pressure at the cylinder base. In such a situation, it is advantageous to temporarily de-activate the ride control feature. Thus, at block 532, if it is determined that the pressure is lower than set point $S_1$, the method moves to block 550, where the ride control feature is set to inactive, if it wasn't inactive already. From there, the method moves to block 522 for another run through the operational portion 520 of the method.

If at block 532, it is determined that the pressure is greater than set point $S_1$, the method moves to block 534, where the method checks to see if the pressure is greater than set point $S_2$. If the pressure is not greater than the set point $S_2$, the method moves to block 522 for another run through the operational portion 520 of the method. If, however, the pressure is greater than the set point $S_2$, the method moves to block 536 to see of the pressure is greater than the set point $S_3$. Also at block 534, a timer is started if the pressure has first been detected that the pressure has risen above the set point $S_2$. If the pressure is not greater than the set point $S_3$, the method goes to block 538 to determine whether the timer has been active for a period of time $D_1$. If the pressure is greater than set point S3, the method goes to block 539 to determine whether the timer has been active for a period of time $D_2$. The delay periods $D_1$ and $D_2$ allow the ride control system to allow for minor pressure spikes without turning off. In some embodiments, $D_1$ and $D_2$ are different times, for example 200 milliseconds and 100 milliseconds, respectively. Other values can be selected for $D_1$ and $D_2$ as may be appropriate. If the timer reaches $D_1$ at block 538 or $D_2$ at block 539, the method moves to block 550, where the ride control feature is inactive. From there, the method moves to block 522 for another run through the operational portion 520 of the method. In some embodiments, however, once the timer has reached $D_1$ or $D_2$, the method may require that the pressure fall to a lower value than $S_2$, before the ride control feature is re-activated. In other words, instead of returning immediately to block 522, the method in some embodiments will require that the pressure fall to some level lower than $S_2$ before returning to block 522. Alternatively or in addition, the method in some embodiments will require that the pressure fall below $S_2$ or some other threshold level for a set amount time before the ride control feature is re-activated. This hysteresis can advantageously prevent excessive cycling on components such as accumulator 340, which can lead to premature failure. Blocks 534, 536, 538, and 539 collectively represent an over-pressure loop 560. In loop 560, the method is allowing the system to differentiate between high pressure conditions, which may damage components and temporary spikes, which can be absorbed without disrupting the ride control feature.

With the basic concept laid out above, variations and additional features can be added to the embodiments discussed above. For example, the ride control system can have a cylinder position loop built in and activate or de-activate the ride control feature based on lift cylinder position. This could further enhance machine stability and digging performance. For example, if the position of the lift cylinder is known, it might be desirable to de-activate the ride control feature when the lift arm rises above a given lift height. The ride control system may be programmed to not re-activate the ride control feature until the lift arm is lowered below a set point. The ride control system could also de-activate the ride control feature if the lift arms are within a minimum acceptable distance from their lowest possible position, to avoid the lift arm from striking mechanical stops for the lift arm. There are a number of known sensors that can be used to sense lift arm height and any suitable one could be used.

In other embodiments, the ride control system can also factor certain operator inputs (electronic joysticks, lift, tilt, or auxiliaries commands) and/or valve spool position into the decision to turn ride control on and off. This can replace (at least in part) using a pressure sensor because this would be a way of knowing where the boom is and whether it has been powered down. A pressure sensor may still be needed to detect high pressure and extremely high pressure situations.

In still other embodiments, the ride control system can factor in the attachment type when deciding to turn ride control on and off. Some attachable implements have electronic modules that are configured to provide an electronic identification signal to a controller on the power machine to which it is attached. The ride control system can use this identification information to determine whether to activate or de-activate the ride control features to maximize the attachment performance. For example, certain implements may or may not work well when the ride control feature is activated. Alternatively, the ride control system could change ride control parameters based on attachment type to improve performance.

In yet other embodiments, the ride control system uses the percentage of pump stroke as a factor for turning ride control on and off. By knowing pump stroke, the controller can determine whether the loader is "roading" (traveling over terrain) or digging and can turn off ride control during digging when it would not provide any suspension type benefit and instead would only reduce the effectiveness of the digging effort. During a roading condition, the pump stroke will not be as great as when digging. By monitoring operator inputs for controlling travel and other machine functions and comparing them to pump stroke conditions, the ride control system determines whether the vehicle is in a roading condition or a digging condition. That is, in a roading condition, the operator would likely not be operating lift and tilt or attachment functions, whereas in a digging operation the operator may be doing so.

In still other embodiments, the pressure sensor 325 is used in an integrated weight log/load indicator to the operator in combination with the machine display to measure the load in, for example, a bucket. This information is used, in some embodiments, as a tip indicator to improve machine stability by not allowing operator to exceed load.

In still other embodiments having a pressure sensor at the inlet to the control valve and at the cylinders will allow the controller to know when the lift cylinder is being powered up or down. Having this information allows the controller to make decisions when to activate and deactivate the ride control feature. More specifically, the ride control feature can be de-activated whenever the lift arm is being actuated through the lift control valve or at least in some situations when the lift arm is being actuated. In some power machines, the controller actively controls the lift control valve and will know when the lift cylinder is being actuated without such an additional pressure sensor. In these types of power machines, the controller can make similar decisions to de-activate the ride control feature when the lift arm is being actuated.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, in various embodiments, different types of power machines can be configured to implement the control valve assembly and power conversion systems and methods. Further, while particular control valve assembly configurations and work functions are illustrated, other valve configurations and types of work functions can also be used. Other examples of modifications of the disclosed concepts are also possible, without departing from the scope of the disclosed concepts.

What is claimed is:

1. A ride control system for a power machine having a frame, a lift arm movably coupled to the frame, and a hydraulic power conversion system, the ride control system comprising:
   a hydraulic cylinder having a first end and a second end, the hydraulic cylinder configured to selectively control movement of the lift arm relative to the frame;
   an accumulator in selective communication with the first end of the hydraulic cylinder;
   a pressure sensor capable of communicating a signal indicative of a hydraulic pressure at the first end of the hydraulic cylinder;
   a ride control circuit configured to allow selective communication between the accumulator and the first end of the hydraulic cylinder; and
   a controller configured to receive the signal from the pressure sensor, wherein the controller is configured to prevent communication between the accumulator and the first end of the hydraulic cylinder until the signal from the pressure sensor indicates a pressure below an initial pressure threshold value, and once the pressure sensor indicates a pressure below the initial pressure threshold value, the controller allows selective communication between the accumulator and the first end of the hydraulic cylinder when the pressure sensor indicates a pressure between an operational minimum pressure threshold, which is lower than the initial pressure threshold and a high pressure threshold, which is higher than the initial pressure threshold.

2. The ride control system of claim 1, wherein the controller is configured to allow communication between the accumulator and the first end of the hydraulic cylinder when the pressure is above the high pressure threshold for a limited period of time.

3. The ride control system of claim 2, wherein the limited period of time is a first limited period of time and wherein the controller is configured to allow communication between the accumulator and the first end of the hydraulic cylinder when the pressure is above an extremely high pressure threshold for a second limited period of time, wherein the second limited period of time is shorter that the first limited period of time.

4. The ride control system of claim 2, wherein the controller is configured to block communication between the accumulator and the first end of the hydraulic cylinder when the pressure has been above the high pressure threshold for the limited period of time and wherein the controller is configured to re-allow communication between the accumulator and the first end of the hydraulic cylinder when the pressure is below a threshold amount.

5. The ride control system of claim 4, wherein the threshold amount is below the high pressure threshold.

6. The ride control system of claim 4, wherein the wherein the controller is configured to re-allow communication between the accumulator and the first end of the hydraulic cylinder when the pressure is below the threshold amount for a given amount of time.

7. A method of providing a ride control feature to dampen loads introduced into a power machine when traveling over a support surface by selectively providing pressurized hydraulic fluid from an accumulator to a first side of a hydraulic actuator coupled between a lift arm and a frame of the power machine to allow the lift arm to move relative to the frame, comprising:

sensing pressure, with a pressure sensor, at the first side of the hydraulic actuator; and using a controller to control a ride control circuit to prevent flow between the accumulator and the first side of the actuator until the sensed pressure is below an initial threshold value.

8. The method of claim 7 and further comprising:

after sensing pressure below the initial threshold value, using the controller to control the ride control circuit to allow flow between the accumulator and the first side of the actuator when the sensed pressure is between a minimum pressure threshold and a high pressure threshold.

9. The method of claim 8, and further comprising using the controller to control the ride control circuit to prevent flow between the accumulator and the first side of the actuator when the sensed pressure is above a high pressure threshold.

10. The method of claim 8, and further comprising using the controller to control the ride control circuit to prevent flow between the accumulator and the first side of the actuator when the sensed pressure is above a high pressure threshold for a period of time.

11. The method of claim 9 and further comprising using the controller to control the ride control circuit to allow flow between the accumulator and the first side of the actuator when the sensed pressure returns to a level between the minimum pressure threshold and the high pressure threshold.

12. The method of claim 9 and further comprising using the controller to control the ride control circuit to allow flow between the accumulator and the first side of the actuator when the sensed pressure returns to a level between the minimum pressure threshold and a threshold that is a lower pressure than the high pressure threshold.

13. The method of claim 12 and further comprising using the controller to control the ride control circuit to allow flow between the accumulator and the first side of the actuator when the sensed pressure returns to a level between the minimum pressure threshold and a threshold that is a lower pressure than the high pressure threshold for a period of time.

* * * * *